United States Patent
Strutt et al.

(10) Patent No.: US 7,830,842 B2
(45) Date of Patent: *Nov. 9, 2010

(54) SYSTEM AND METHOD FOR DETERMINING THE MOBILITY OF NODES IN A WIRELESS COMMUNICATION NETWORK

(75) Inventors: Guenael Strutt, Sanford, FL (US); Shyamal Ramachandran, Maltland, FL (US)

(73) Assignee: MeshNetworks, Inc., Maitland, FL (US)

( * ) Notice: Subject to any disclaimer, the term of this patent is extended or adjusted under 35 U.S.C. 154(b) by 1033 days.

This patent is subject to a terminal disclaimer.

(21) Appl. No.: 11/314,219

(22) Filed: Dec. 21, 2005

(65) Prior Publication Data

US 2006/0160540 A1   Jul. 20, 2006

Related U.S. Application Data

(60) Provisional application No. 60/640,171, filed on Dec. 30, 2004.

(51) Int. Cl.
*H04W 4/00* (2009.01)

(52) U.S. Cl. .................. 370/338; 370/328; 455/441; 455/404.2; 455/456.1

(58) Field of Classification Search .......... 370/338, 370/328; 455/441, 404.2, 456.1
See application file for complete search history.

(56) References Cited

U.S. PATENT DOCUMENTS

| | | | |
|---|---|---|---|
| 5,729,826 A | 3/1998 | Gavrilovich | |
| 5,896,411 A | 4/1999 | Ali et al. | |
| 6,075,797 A | 6/2000 | Thomas | |
| 6,277,813 B1 | 8/2001 | Kelly | |
| 6,337,853 B1 | 1/2002 | Piolini | |
| 6,618,596 B1 | 9/2003 | Uchida | |
| 6,795,688 B1 | 9/2004 | Plasson et al. | |
| 6,807,165 B2 | 10/2004 | Belcea | |
| 6,845,239 B1* | 1/2005 | Sato et al. | 455/456.1 |
| 6,873,839 B2 | 3/2005 | Stanforth | |
| 6,930,470 B2* | 8/2005 | Periyalwar et al. | 370/204 |
| 7,181,214 B1* | 2/2007 | White | 455/435.1 |
| 7,412,241 B2 | 8/2008 | Strutt | |
| 2002/0058502 A1 | 5/2002 | Stanforth | |
| 2002/0160764 A1 | 10/2002 | Gorsuch | |
| 2003/0134658 A1 | 7/2003 | Kaminski et al. | |

(Continued)

FOREIGN PATENT DOCUMENTS

WO    03043359 A1    5/2003

(Continued)

OTHER PUBLICATIONS

PCT International Search Report Application No. PCT/US05/46219 Dated Feb. 12, 2008—10 Pages.

(Continued)

*Primary Examiner*—Nghi H Ly
(74) *Attorney, Agent, or Firm*—Randi L. Karpinia (57) ABSTRACT

A system and method for determining the mobility of a node (102) in a wireless communication network (102). The system and method determine the distance between the node (102) and at least one stationary neighboring node (102, 106, 107) at at least two or more time points, using at least two moving average filters, to arrive at two distance values. The system and method then determine the relative velocity based on the at least two distance values, and thus determine whether the node (102) is mobile.

20 Claims, 6 Drawing Sheets

U.S. PATENT DOCUMENTS

| | | |
|---|---|---|
| 2004/0082341 A1 | 4/2004 | Stanforth |
| 2005/0020279 A1* | 1/2005 | Markhovsky et al. .... 455/456.1 |
| 2006/0003789 A1 | 1/2006 | Murata et al. |

OTHER PUBLICATIONS

PCT/US2005/046219, PCT Preliminary Report on Patentability, mailed Mar. 19, 2009, 10 pages.

Korean Patent Office, Korean Application No. 10-2007-7017393, Office Action [translated], Rejection, email dated Sep. 28, 2008, 5 pages.

Korean Patent Office, Korean Application No. 10-2007-7017393, Office Action [translated], Rejection, email dated Mar. 2, 2009, 4 pages.

PCT/US05/46220, PCT Search Report and Written Opinion, mailed Mar. 3, 2008, 9 pages.

USPTO, Application No. 11314223, Office Action, Non-Final Rejection, Jun. 13, 2008, 13 pages.

PCT/US2005/046220, PCT Preliminary Report on Patentability, mailed Mar. 5, 2009, 8 pages.

Korean Patent Office, Korean Application No. 10-2007-7017510, Office Action [translated], Notice of Preliminary Rejection, email dated Dec. 24, 2008, 4 pages.

Japanese Patent Office, Japanese Application No. 2007-549475, Office Action [translated], Rejection, email dated Oct. 29, 2009, 3 pages.

European Patent Office (EPC), Application No. 05 854 866.0 - Office Action (Rejection) dated Jul. 15, 2010 - 6 pages.

* cited by examiner

SYSTEM AND METHOD FOR DETERMINING THE MOBILITY OF NODES IN A WIRELESS COMMUNICATION NETWORK

This application claims the benefit of U.S. Provisional Application No. 60/640,171, filed Dec. 30, 2004 the entire content of which being incorporated herein by reference.

CROSS-REFERENCE TO RELATED APPLICATION

Related subject matter is described in a United States Patent Application Publication 2006 0159030 A1 by Guenael T. Strutt et al. entitled "System and Method for Managing Communication Links Between Nodes in a Wireless Communication Network", filed concurrently herewith, the entire content of which is incorporated herein by reference.

FIELD OF THE INVENTION

The present invention relates to wireless communication networks and, more particularly, to a system and method for determining the mobility of a node in a multihopping wireless communication network.

BACKGROUND

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in United States Patent Application Publication number US-2002-0058502-A1 entitled "Ad Hoc Peer-to-Peer Mobile Radio Access System Interfaced to the PSTN and Cellular Networks", filed on Jun. 29, 2001, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted Oct. 19, 2004, and in U.S. Pat. No. 6,873,839 entitled "Prioritized-Routing for an Ad-Hoc, Peer-to-Peer, Mobile Radio Access System", granted Mar. 29, 2005, the entire content of each being incorporated herein by reference.

As can be appreciated by one skilled in the art, it is desirable to monitor the movement of nodes in a multihopping network in order to, for example, manage the links between nodes, perform location measurement operations, and so on. An example of a system and method for determining the mobility of a node in a network is described in U.S. Pat. No. 7,181,214 entitled "A System and Method for Determining the Measure of Mobility of a Subscriber Device in an Ad-Hoc Wireless Network with Fixed Wireless Routers and Wide Area Network (WAN) Access Point", granted on Feb. 20, 2007, the entire contents being incorporated herein by reference. Further examples of techniques for determining mobility are set forth in United States Patent Application Number 20020160764, and in U.S. Pat. Nos. 6,795,688 and 6,075,797.

Other techniques for detecting the mobility of a node are based on the assumption that a significant number of neighboring nodes are stationary by nature. This assumption is limiting because it assumes a presence of inherently stationary nodes, and it does not address the issue of a large presence of inherently mobile nodes that are for a time stationary but have the potential to move, which can lead to network instability.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for determining the mobility of a node in a multihopping wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for determining the mobility of a node in a multihopping wireless communication network as described herein. The non-processor circuits may include, but are not limited to, a radio receiver, a radio transmitter, signal drivers, clock circuits, power source circuits, and user input devices. As such, these functions may be interpreted as steps of a method for determining the mobility of a node in a multihopping wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for assessing the degree of mobility of a node in a wireless network. The system and method determine the distance between the node and at least one neighboring node at at least two or more moments in time using, for example, a plurality of moving average filters. The system and method then determine the relative velocity of the node based on the distance. The set of relative velocities to all or substantially all of the neighboring nodes is used to calculate a mobility factor for the node, which the node can continue to recalculate over time.

Accordingly, the system and method provide an accurate determination of the degree of mobility of a node in a multihopping wireless communication network, thus allowing for other more accurate calculations, such as link quality calculations, without requiring an a priori assumption as to the nature of the nodes in the network. The present invention also provides a technique for ensuring that the distance measurements between a node and a neighboring node is sufficient to assess the degree of mobility of the node and to establish whether the node is mobile, even if the distance measurements include an error component.

Figure 1:
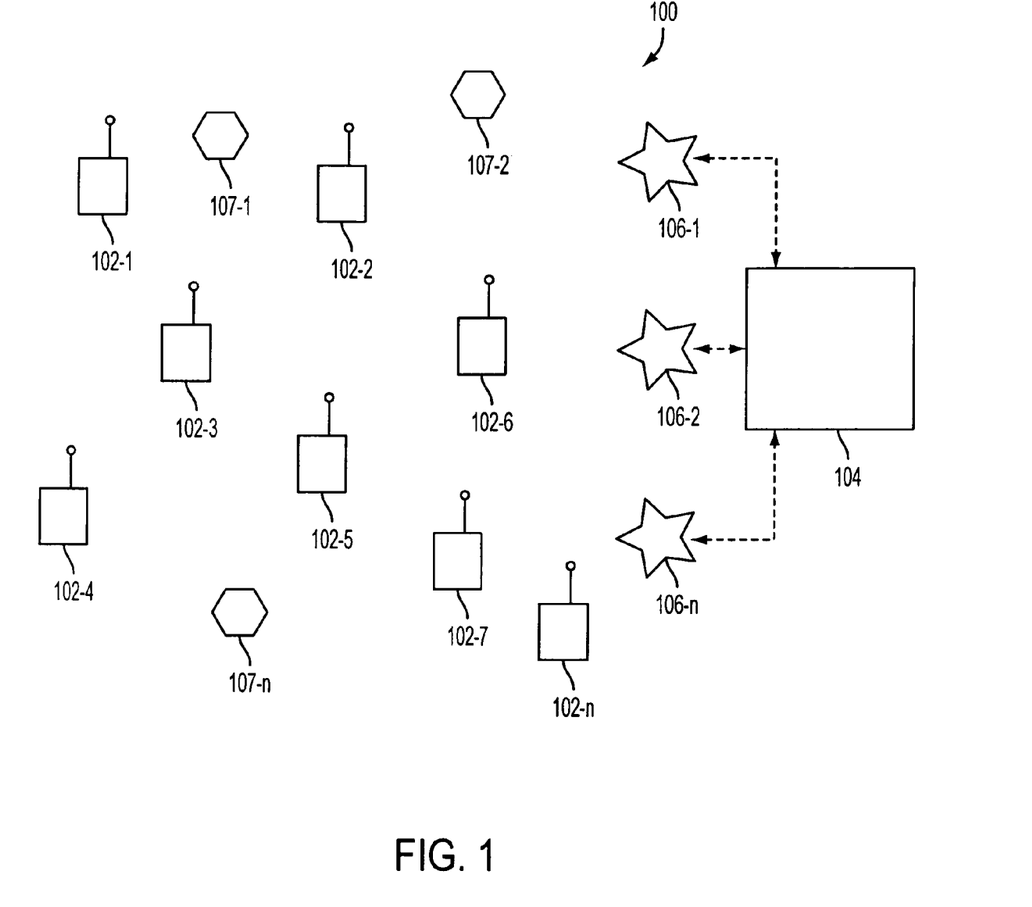
FIG. 1 is a block diagram of an example ad-hoc wireless communications network including a plurality of nodes employing a system and method in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106, access points (APs) 106 or intelligent access points (IAPs) 106), for providing nodes 102 with access to the fixed network 104. The fixed network 104 can include, for example, a core local access network (LAN) or wide area network (WAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107, fixed routers 107 or wireless routers (WRs) 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in United States Patent Application Publication Number US-2002-0058502-A1, and U.S. Pat. Nos. 6,807,165 and 6,873,839, referenced above.

Figure 2:
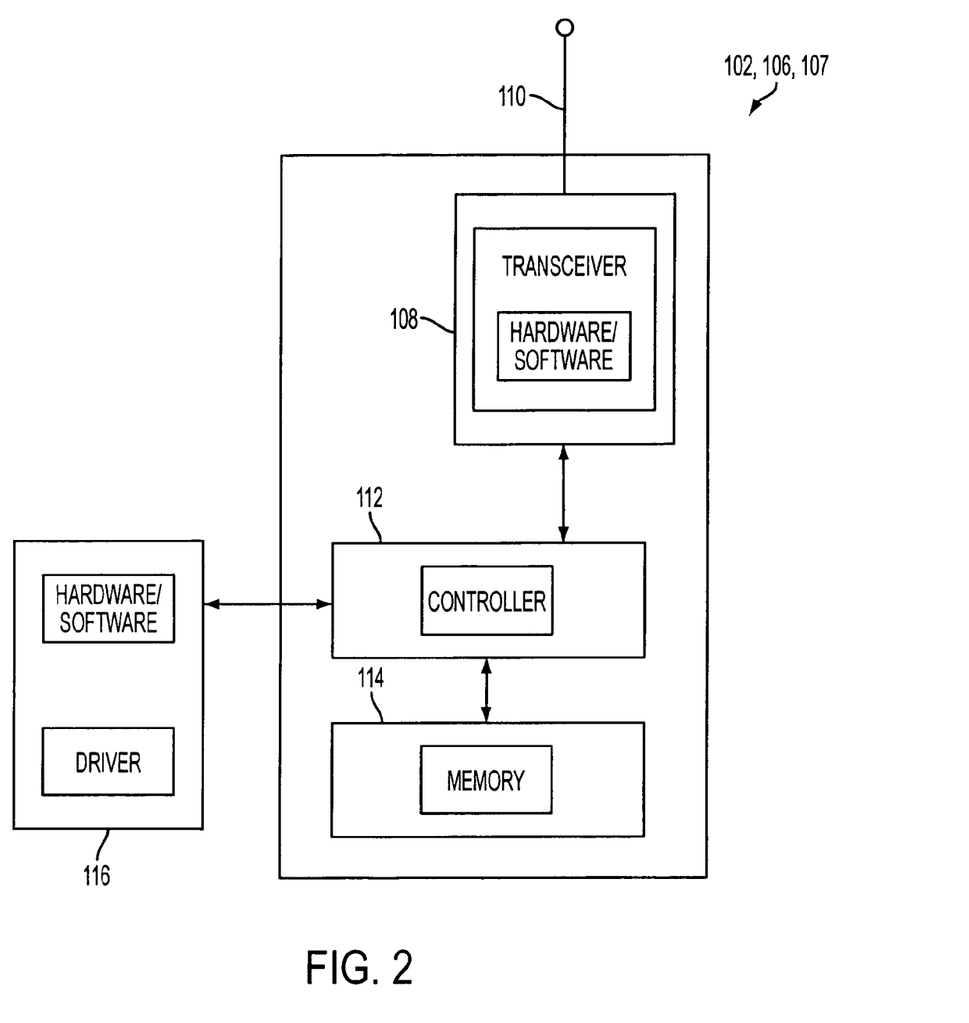
FIG. 2 is a block diagram illustrating an example of a node employed in the network shown in FIG. 1.

As shown in FIG. 2, each node 102, 106 and 107 includes at least one transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Figure 3:
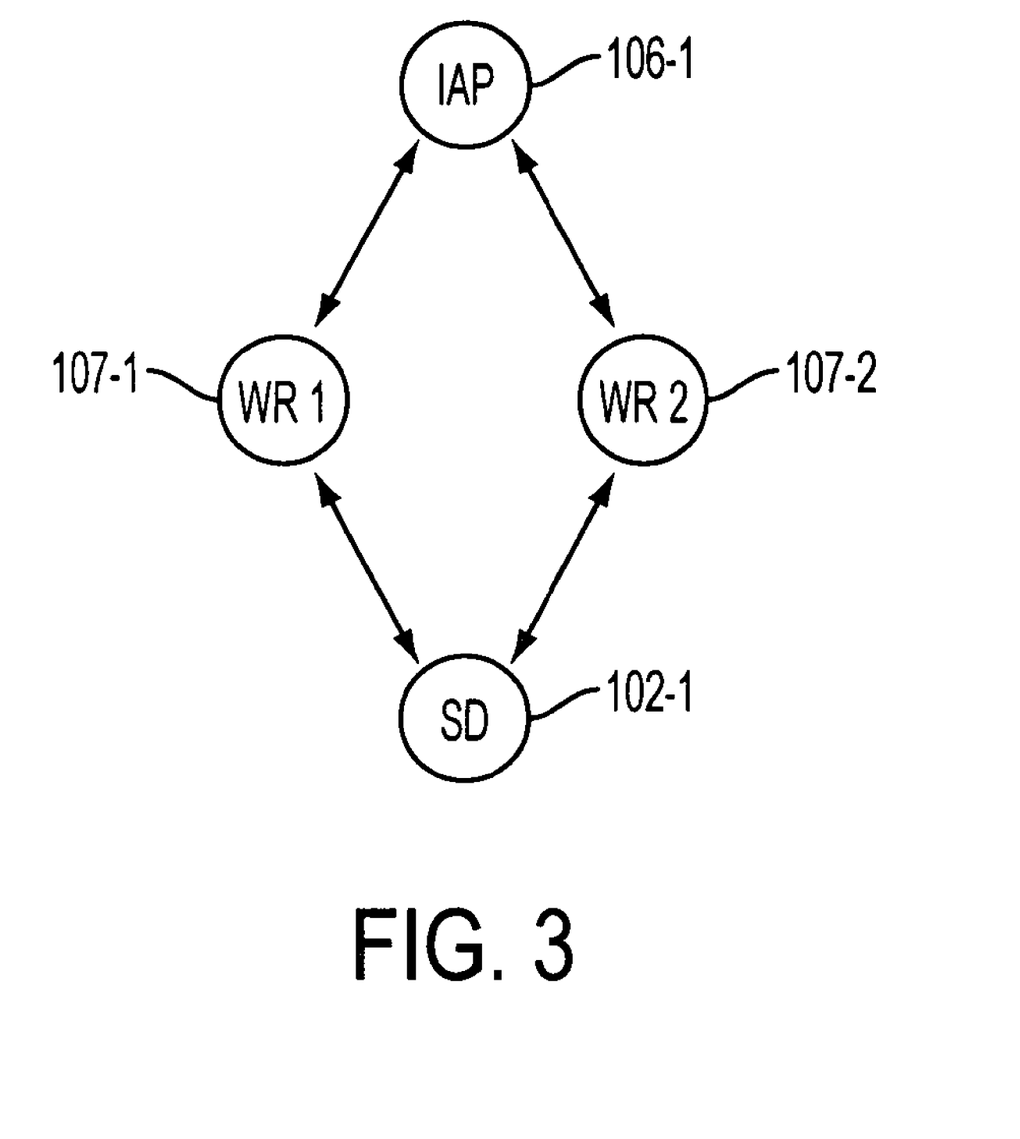
FIG. 3 is a block diagram illustrating an example of communication links between several nodes in the wireless communication network as shown in FIG. 1.

As can be appreciated by one skilled in the art, changes in links between the nodes 102, 106 or 107 often occur due to, for example, movement of the mobile nodes 102. FIG. 3 illustrates an example of links between an SD 102-1, wireless routers 107-1 and 107-2, and an IAP 106-1 in the network 100. The quality of the links between the SD 102-1 and the wireless routers 107-1 and 107-2 can change when the SD 102-1 moves.

As can further be appreciated by one skilled in the art, the information pertaining to the mobility of a node 102, 106 or 107 can be provided a priori (independently of experience) or calculated a posteriori (on the basis of experience). For example, a node such as an IAP 106 or WR 107, that is designed to be attached to a pole or mounted on a building, is deemed to be "stationary", while a node (e.g., node 102) that is designed to be mounted on a vehicle or held by an end-user is deemed to be "mobile". Information indicating whether a node 102, 106 or 107 is by nature "stationary" or "mobile" can be hard-coded a priori in a memory 114 of the node 102, 106 or 107. However, the mobility of a node 102, 106 or 107 can also be determined a posteriori by, for example, a global positioning system (GPS) or a technique according to an embodiment of the present invention as discussed below, which provides a more accurate representation of the mobility of the node 102, 106 or 107.

For example, in an emergency first-responder scenario, a large number of nodes 102 that are mobile, by nature, can need to form a network 100 in a relatively small geographic area. The mobile nodes 102 communicate with each other in a multihopping manner in order to increase the capacity of the network 100. In this scenario, it is typical for some mobile nodes 102 to be unable to access the network 100, because of network capacity limitations. Capacity can be increased by using shorter links with inherently higher capacities, and/or by reducing transmit power, in order to increase spatial reuse. Therefore, instead of all of the nodes 102 being used as mobile nodes, the first-responders may deploy some of the mobile nodes 102 in a stationary manner to operate as routers and thus increase the capacity of the network 100. In this event, the a prior knowledge that the node 102 is a mobile node is unsuitable. Therefore, the network 100 should be able to reliably ascertain the mobility of the nodes 102 to determine which nodes 102 are indeed operating as mobile nodes and which are operating as stationary nodes, so that the stationary nodes can utilize, for example, more stable network discovery protocols and slower convergence rates in ascertaining link quality, as described in the related United States Patent Application Publication 2006 0159030 A1 entitled "System and Method for Managing Communication Links Between Nodes in a Wireless Communication Network", referenced above.

As discussed above, mobility detection can be performed in several ways. If, for example, a mobile node 102 includes a GPS receiver, then the velocity of the mobile node 102 can be computed with reasonable accuracy. Moreover, if the mobile node 102 is capable of comparing the distance between itself and known stationary nodes such as IAPs 106 or fixed routers 107, then the mobility of the node 102 can be easily ascertained. However, if the status of the nodes is not known, then it is more difficult to determine which node actually is mobile since both the stationary mobile node 102 and the moving mobile node 102 will detect a change in the distance between each other.

According to an embodiment of the present invention, each mobile node 102 determines whether it is actually moving as discussed in more detail below, and sets a mobility flag to either zero (0) indicating "stationary" or one (1) indicating "mobile". Each node 102 can start with a mobility status of "1," meaning that a node 102 is presumed to be mobile unless determined otherwise. Known stationary nodes, such as fixed routers 107 or IAPs 106 that have wired connections, can have a mobility flag always set to zero (0). At regular intervals, for example, at every beacon interval which can be 100 millisecond (ms) intervals, each node 102, 106 and 107 preferably sends to its neighbors a special frame (such as a beacon) which contains its own mobility flag information. Each node 102, 106 and 107 in the network 100 can use this information to determine whether the links to their neighbor nodes 102, 106 and 107 are static or mobile, thus providing an indication of node mobility.

Figure 4:
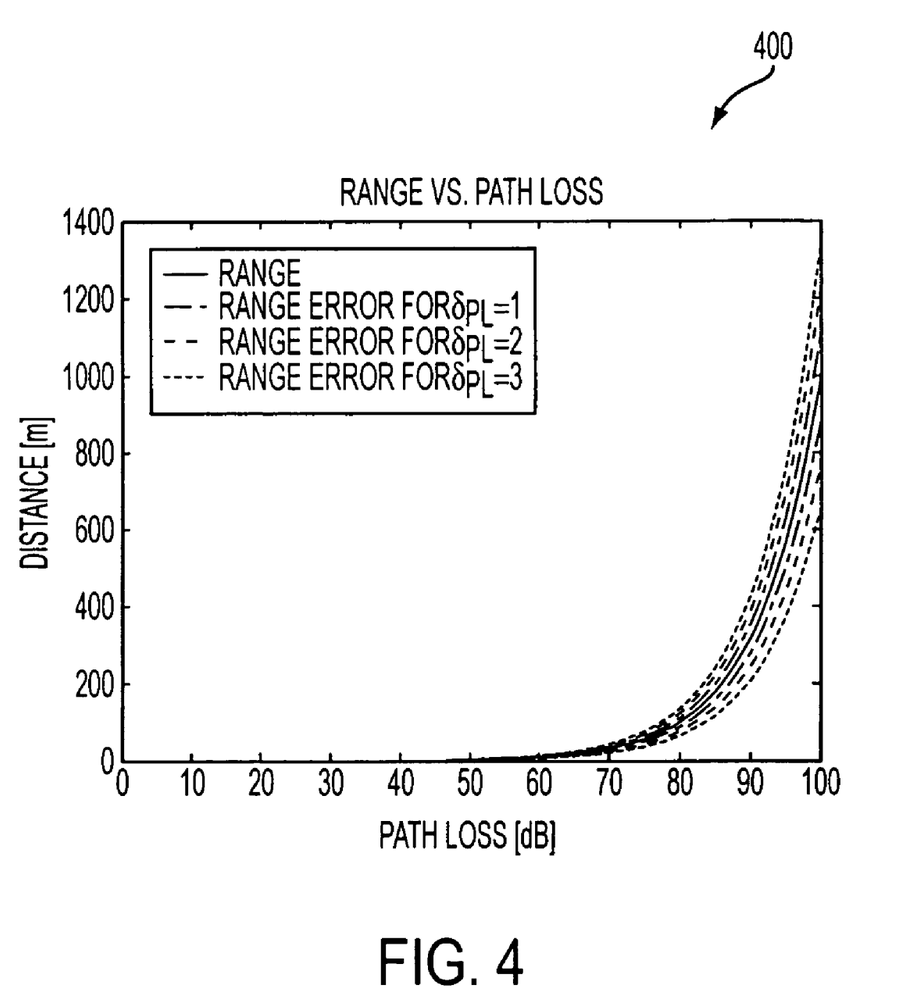
FIG. 4 is a graph illustrating a distance estimation at a node in a network versus the path loss, and the effect of an error component, in accordance with an embodiment of the present invention.

As can be appreciated by one skilled in the art, since mobility is generally considered the movement of a node 102 over a certain distance in a certain amount of time, a technique for determining mobility according to an embodiment of the present invention can establish a relationship between measured parameters, such as the Receive Signal Strength Indication (RSSI) in dBm (decibels relative to a milliwatt), or a round-trip signal propagation time in nanoseconds (ns), and calculate a distance measurement in meters, or any other suitable unit of measure, between the node 102 and a reference point. For example, the relationship between the path loss PL of a signal propagating over a link and distance d between the source and destination of the signal, can be approximated using a free-space propagation formula:

$$d = \frac{\lambda}{4\pi} 10^{\frac{-PL}{20}}$$

where $\lambda$ is the wavelength of the signal. The relationship between round-trip signal propagation time and distance can therefore be approximated using the speed of light c as can be appreciated by one skilled in the art. An example of distance estimation using the path loss is depicted, for example, in the graph 400 shown in FIG. 4.

The distance can be estimated at every beacon interval. Therefore, it is possible to estimate the relative velocity between a node 102 and at least one neighboring node 102, 106 or 107 as the distance between them changes over time. In order to limit the amount of memory required to compute the variation in distance over time, two or more exponentially weighted moving average filters can be used as discussed below. As can be appreciated by one skilled in the art, the moving average filters are used to smooth out large variations in signal strength measurements that could cause errors if they were not filtered. While there are other techniques to measure the relative velocity between two nodes 102, 106 or 107, the technique according to an embodiment of the present invention advantageously can be used in circumstances where the beacon interval is not constant. This is especially useful in environments where neighboring nodes 102, 106 or 107 will not receive all of the beacons that are sent by a node (e.g., node 102) whose mobility is being determined.

Figure 5:
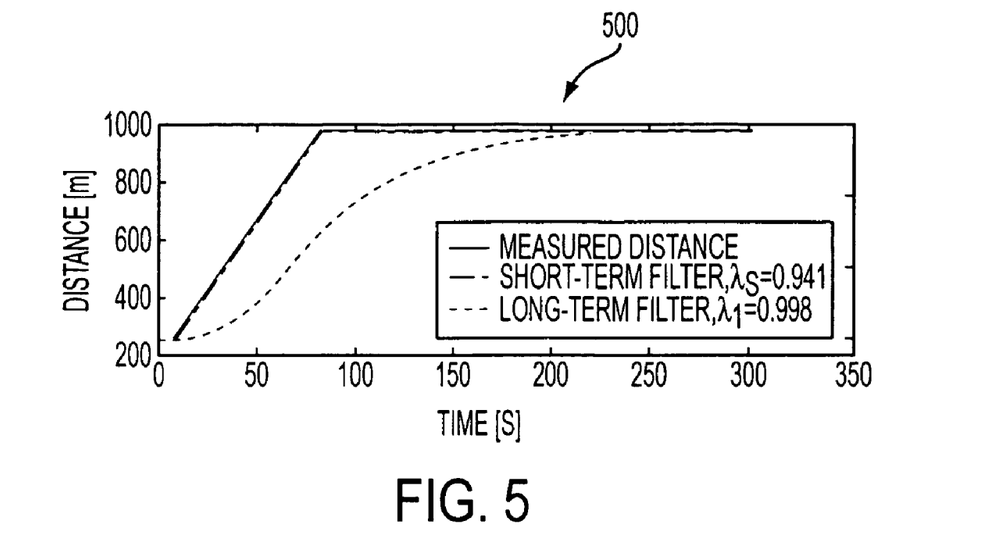
FIG. 5 is a graph illustrating an example of the distance between a node and a neighboring node in a network as shown in FIG. 1, as measured over time using a short-term moving average filter and a long-term moving average filter, in accordance with an embodiment of the present invention.

The two filters employed in this example are long-term and short-term filters, and can be embodied, for example, as mathematical processes performed by the controller 112 of the node (e.g., node 102) and its related hardware and software. The two filters calculate two distances $\bar{d}_l$ and $\bar{d}_s(t)$ using the measured distance d(t) (e.g., as calculated by the above equation) as shown in the following equation.

$$\begin{cases} \bar{d}_l(t) = \lambda'_l \cdot d(t) + (1 - \lambda'_l) \cdot \bar{d}_l(t-1) \\ \bar{d}_s(t) = \lambda'_s \cdot d(t) + (1 - \lambda'_s) \cdot \bar{d}_s(t-1) \end{cases}$$

with t being the sample interval of the distance calculation, and $\lambda'_s$ and $\lambda'_l$ representing the forgetting factors as used by the short-term filter and long-term filter respectively. In this example, the value of $\lambda'_s$ is 0.941 and the value of $\lambda'_l$ is 0.998, however, any suitable values can be selected as can be appreciated by one skilled in the art. The results of the calculated distances over time are shown in the graph 500 of FIG. 5.

Figure 6:
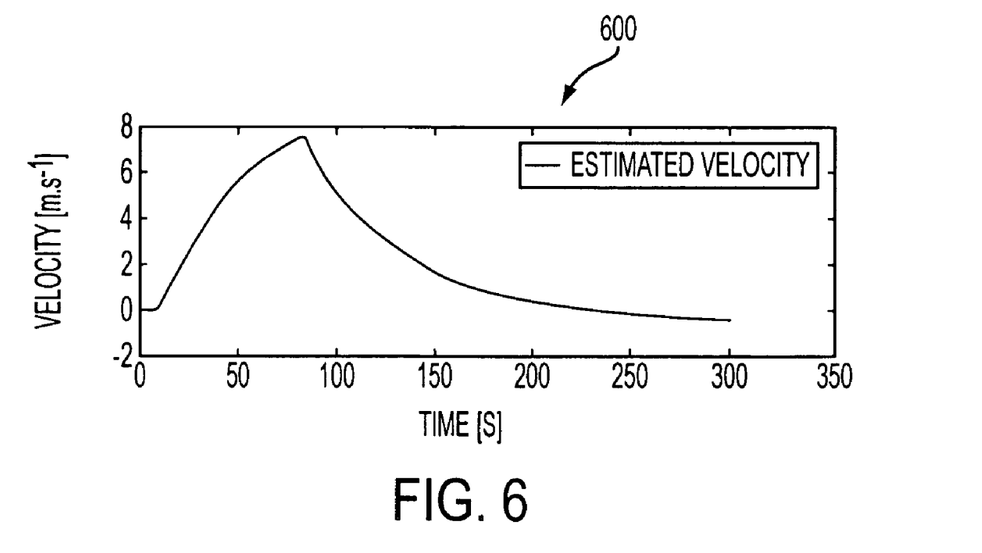
FIG. 6 is a graph illustrating the relative velocity of a node in a network, as estimated using the measured distance as shown in FIG. 5, in accordance with an embodiment of the present invention.

From these two distances $\bar{d}_l(t)$ and $\bar{d}_s(t)$, it is possible to estimate the relative velocity V(t), as shown in the following equation:

$$V(t) = \frac{\Delta \bar{d}(t)}{\Delta T}$$

$$= \frac{\bar{d}_s(t) - \bar{d}_l(t)}{(t - \Delta t_b \cdot N_s) - (t - \Delta t_b \cdot N_l)}$$

$$= \frac{\bar{d}_s(t) - \bar{d}_l(t)}{\Delta t_b \cdot \left(\frac{1}{\lambda_l'} - \frac{1}{\lambda_s'}\right)}$$

with the variables being as described above, and $N_s$ and $N_l$ being a respective number of independent samples used by the short-term filter and long-term filter, respectively. The results of the estimated velocity are shown in the graph 600 of FIG. 6:

It should be noted that the previous equations are established using the moving average/exponentially weighted moving average filters equivalency properties:

$$\begin{cases} \bar{d}(t) = \frac{1}{N} \sum_{i=t-N+1}^{t} d(i) \\ \bar{d}(t) = \lambda' \cdot d(t) + (1 - \lambda') \cdot \bar{d}(t-1) \end{cases}$$

and $$\begin{cases} N_l = \frac{1}{\lambda_l'} - 1 \\ N_s = \frac{1}{\lambda_s'} - 1 \end{cases}$$

where the variables are as described above. As can be appreciated by one skilled in the art, the exponentially weighted moving average filter equation is often expressed as a function of the forgetting factor λ:

$$\lambda' = 1 - \lambda = \frac{1}{N+1}$$

where the variables are as described above.

Error Considerations:

If the error in path loss measurement is given as $\delta_{PL}$ (as shown, for example, in FIG. 4), the error in the estimated range, $\delta_d$ is computed using:

$$\delta_d = -d \frac{\ln(10)}{20} \delta_{PL}$$

Also, the error in the mean range error, $\bar{\delta}_d$ over N independent samples, each with an error of $\delta_d$, is given by:

$$\bar{\delta}_d = \frac{\delta_d}{\sqrt{N}}$$

The error in the estimated relative velocity as computed using the above equation, is given by:

$$\delta_v = \frac{-d\ln(10)}{20\Delta t_b}\left(\frac{\lambda_l' \lambda_s'}{\lambda_s' - \lambda_l'}\right)\sqrt{\frac{\lambda_s'}{1-\lambda_s'} + \frac{\lambda_l'}{1-\lambda_l'}} \delta_{PL}$$

It should also be noted that if one or more of the absolute relative velocities V(t) becomes greater than $V_{lim}$ (the velocity threshold), then the node 102 enters a "mobility confirmation" state where the node will assume that it is mobile. Granted, the fact that a node 102 has detected that it has a large absolute relative velocity with respect to another node 102, 106 or 107 does not necessarily mean that the node 102 performing the calculation is mobile, and it is indeed possible that the other node (e.g., another node 102) has started moving. However, the purpose of the "mobility confirmation" state is to allow for those nodes 102 which are most likely to be moving to advertise the fact that they are now mobile with respect to those nodes (e.g., other nodes 102) that are least likely to be moving. This process is described in more detail below.

The system and method according to the present invention also address the situations when a stationary mobile node 102 begins to move, or a moving mobile node 102 stops moving and becomes stationary. These conditions are discussed in the sections below, and in more detail with regard to FIG. 7.

Stationary Node Becomes Mobile:

As discussed above, once mobility with respect to at least one other node (e.g., a stationary mobile node 102, an IAP 106 or a WR 107) has been detected, a node 102 can determine whether it is stationary and the other node or nodes is/are mobile. To do so, the node 102 determines the likelihood of it being stationary or mobile. A node 102 is deemed likely to be stationary if the number of dynamic links (i.e., links for which the absolute relative velocity V(t) is above the threshold $V_{lim}$) is much smaller than the number of static links. Since the number of links is not constant, and the process compares a node 102 with a disparate number of stationary neighbors 102, 106 or 107, different statistics can be used to estimate the degree of mobility.

For example, the mean velocity of a node 102 can be examined, and the higher the mean velocity, the more likely it is that the node 102 is mobile. However, if there are numerous neighbor nodes 102, 106 or 107, not all links will appear dynamic and the mean will not be necessarily high. The skewness of the distribution of the link types can be also considered. A large positive skewness indicates that there are few dynamic links and numerous static links. This is indicative of a stationary mobile node 102 determining that one or more neighbor nodes 102 have started moving.

After one link has been determined to be mobile, the node 102 preferably waits a period of time which is proportional to its "fixedness" ratio or, in other words, the likelihood that the node 102 is stationary:

$$t_{verif} = k_1 \cdot \Delta t_b \cdot \left(\frac{V_{lim} - \mu_{|V|}}{V_{lim}}\right) + k_2 \cdot \gamma_{|V|}$$

where $k_i$ are empirical scaling factors, $\Delta t_b$ is the time between beacons, $\mu_{|V|}$ is the mean of the absolute relative velocity to all the neighbor nodes 102, 106 or 107, and $\gamma_{|V|}$ is the skewness of the absolute relative velocities to all the neighbor nodes 102, 106 or 107. The waiting period gives more time for a node 102 that has not detected many dynamic links to detect beacon advertisements from other nodes 102, 106 and 107, and especially from other nodes 102 that were once mobile but have become stationary and are advertising in their beacons that they are now stationary. A node 102 which has computed a smaller $t_{verif}$ is more likely to set its mobility flag to one (1). This allows those nodes 102 that have computed a larger tverif not to set their mobility flag to one (1), if they receive a beacon that indicates that this particular node 102 having a smaller $t_{verif}$ is mobile. The beacon interval $\Delta t_b$ should therefore be much smaller than the typical verification time $t_{verif}$.

Also, instead of waiting for the time $t_{verif}$ to expire before a node 102 sets its mobility flag to one (1), it is possible for a node to set the mobility flag of that node 102 to one (1), if a route error message has been sent to the IAP 106 from the node's next hop node to the IAP 106 (or vice versa), and if this next hop node is stationary (e.g., a WR 107). Route errors occur in circumstances when alternate next hops do not appear to provide a good link quality. This means that the node 102 needs to find an alternate route quickly, which can be due to the mobility of the node 102.

Mobile Node Becomes Stationary:

If, after a certain number of beacon intervals F, a node 102 determines that the measured distance between itself and all its stationary neighbor nodes 102, 106 or 107 (i.e., those advertising a mobility flag of one (0) in their beacons) has not changed (that is, the relative velocity V(t) is consistently smaller than $V_{lim}$), the node 102 may consider itself to have become stationary and thus set its mobility flag to zero (0). If, on the other hand, a node 102 does not have any stationary neighbor nodes 102, 106 or 107, the node 102 may still view itself to be mobile.

Figure 7:
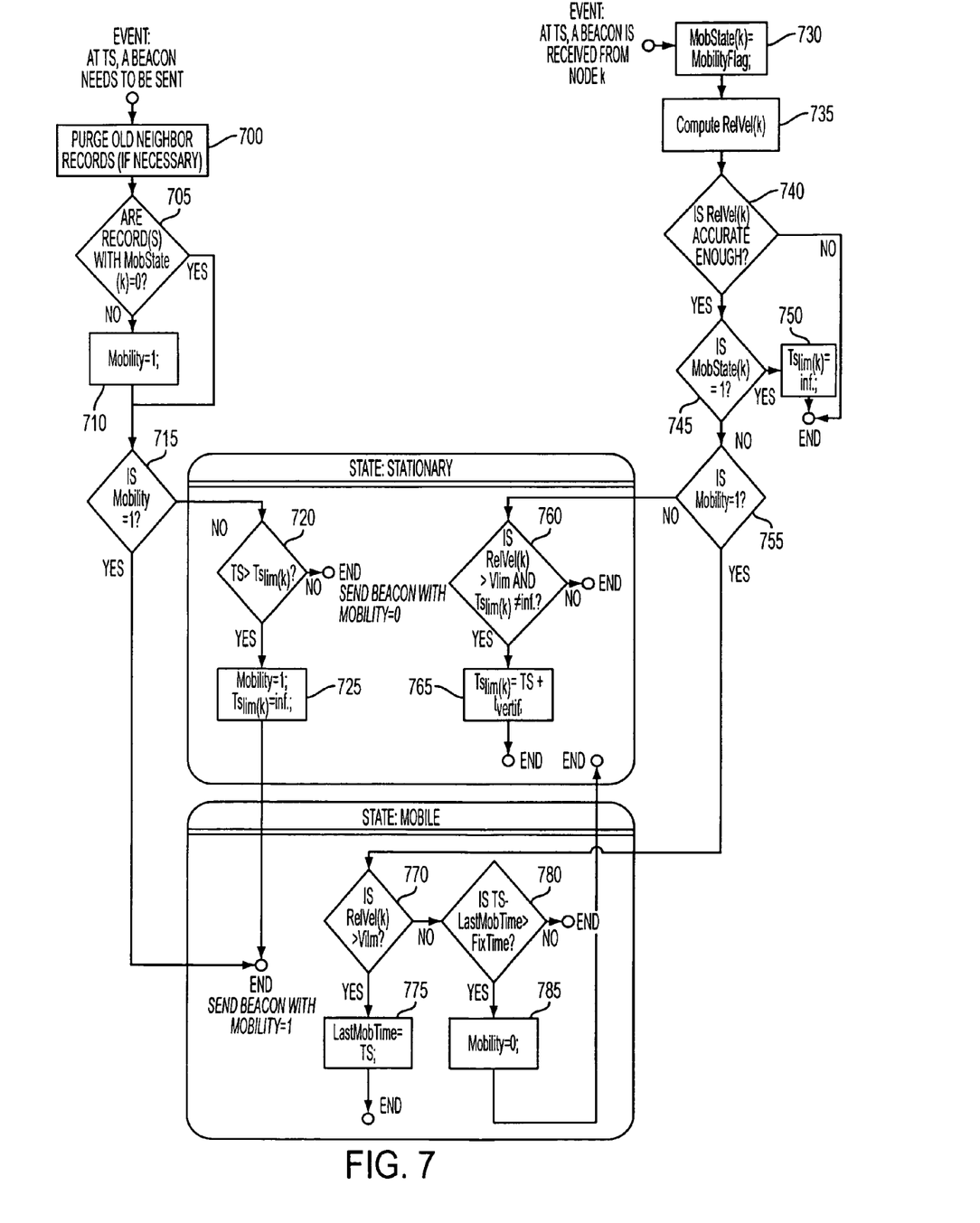
FIG. 7 is a flowchart illustrating an example of operations that can be performed by a node in the network as shown in FIG. 1 to determine whether the node is in a mobile state or a stationary state, in accordance with an embodiment of the present invention.

The above conditions can be appreciated in more detail by the flowchart of FIG. 7, which illustrates an example of a process according to an embodiment of the present invention that can be performed by a node 102 to verify whether it is in a mobile state or stationary state. It is noted that the operations described below can be performed by the controller 112 of the node 102 and its related hardware and software. Also, the variables used in the flowchart are defined as follows:

TS: Timestamp (current time);
k: Index of neighbor node;
RelVel(k): Relative velocity to node k;
MobState(k): Mobility state (0=stationary, 1=mobile) of node k;
MobilityFlag: Mobility state included in the beacon; $Ts_{lim(k)}$:
    Timestamp limit (expiration of the mobility detection timer) of node k;
Mobility: Mobility state (0=stationary, 1=mobile) of current node;
Vlim: Velocity threshold;
FixTime: Time required to determine whether node is stationary;
LastMobTime: Last time at which mobility was established with respect to a fixed node;
$t_{verif}$: Verification time (backoff) based on average relative velocity and skewness.

As shown in FIG. 7, the node 102 can either be sending a beacon at time TS or receiving a beacon from another node 102, 106 or 107 at time TS. For purposes of this discussion, we will initially assume that the node 102 is to send a beacon at time TS. When the node 102 is about the send the beacon, the node 102 can optionally purge stale information pertaining to old neighboring nodes 102, 106 or 107 from its memory 114 in step 700, if necessary. The node 102 then determines in step 705 whether its memory 114 contains any records for any other node 102, 106 or 107 (node "k") indicating that any other node 102, 106 or 107 is stationary. If not, the mobility flag for the node 102 is set to one (1) in step 710, which is the "default" condition for the node 102. That is, when no stationary neighbor nodes have been identified, the node 102 will identify itself as mobile. However, if the memory 114 does contain such a record, the processing bypasses step 710 so that the node 102 will then determine whether it should be identified as mobile or stationary as discussed below.

In step 715, the processing determines if the mobility flag for the node 102 is set to one (1). If the process determines that the mobility flag is set to one (1), the node 102 transmits the beacon with a mobility flag of one (1). If the mobility flag is not set to one (1), the processing proceeds to step 720 where it is determined if the current time is greater than the expiration of the mobility detection timer of the node "k". If not, the node 102 transmits the beacon with a mobility flag set to zero (0), indicating that the node 102 has not determined itself to be mobile. However, if in step 720 the current time is greater than the expiration of the mobility detection timer of the node "k", then in step 725, the timestamp limit $Ts_{lim(k)}$ for the mobility detection timer is set to infinity and the mobility flag of the node 102 is set to one (1). This means that the detection timer with respect to a neighbor node "k" has expired without the node 102 receiving a beacon from the node "k" containing information indicating that the node "k" is mobile. Hence, the node 102 assumes that it is mobile. The node 102 then transmits the beacon with a mobility flag of one (1).

Concerning the condition when the node 102 receives a beacon from another node 102, 106 or 107 (node "k") at time TS as shown in the flowchart of FIG. 7, the node 102 in step 730 sets the mobility state variable MobState(k) for that node "k" to be the value of the mobility flag contained in the received beacon. The node 102 then computes the relative velocity in step 735 with respect to that node "k" using the equations as discussed above. The node 102 then determines in step 735 whether the relative velocity is believed to be accurate. That is, if the error in the calculated relative velocity is too large compared to the distance between the node 102 and node "k", the node 102 would ignore that calculation and end the processing as indicated.

However, if the relative velocity is deemed to be accurate, the processing proceeds to step 745 where the node 102 will determine if the mobility state of node "k" has been set to one (1). If so, the processing proceeds to step 750 where the node 102 sets the timestamp limit $Ts_{lim(k)}$ for node "k" to be infinity. The processing then can proceed, for example, to the steps discussed above where the node 102 is about to send a beacon, or can repeat at step 730 if the node 102 receives another beacon from another node 102, 106 or 107, which would be the new node "k" for purposes of the processing.

On the other hand, if in step 745, the node 102 determines that the mobility state of the node "k" has not been set to one (1), the processing proceeds to step 755 to determine whether the mobility value of node 102 is one (1) or zero (0). If the node 102 determines in step 755 that its mobility value is zero (0) indicating that it is in the stationary state, the processing proceeds to step 760. In step 760, the node 102 determines whether the relative velocity of node 102 with respect to node "k" is not greater than the velocity threshold and the timestamp limit $Ts_{lim(k)}$ for node "k" is not infinity. If both of these conditions are not met, the processing ends, and can continue as discussed above depending on whether the node 102 is about to send a beacon or whether the node 102 receives another beacon from another node 102, 106 or 107.

However, if both of those conditions are met, the node 102 sets the timestamp limit $Ts_{lim(k)}$ for node "k" to be equal to the timestamp value TS (the time that the beacon was received) plus the time needed for verification (the value of $t_{verif}$). The processing then ends, and can continue as discussed above depending on whether the node 102 is about to send a beacon or whether the node 102 receives another beacon from another node 102, 106 or 107. It is noted, in particular, that if the node 102 was determined to be in the stationary state prior to performing the processing beginning at step 730 as discussed above (i.e., its mobility variable is set at zero (0)), the node 102 remains in the stationary state as shown in FIG. 7.

It is noted, however, that if the node 102 determines in step 755 that its mobility value is set at one (1) indicating that it is mobile, the processing proceeds to step 770 where the node determines whether its relative velocity with respect to node "k" is greater than the velocity threshold. If so, the processing proceeds to step 775 where the node 102 sets the variable LastMobTime to the time TS, indicating that the time TS at which the node 102 received the beacon is the last time at which the node 102 established mobility with respect to a fixed node (note the mobility state of node "k" was determined to be zero (0) in step 745 as discussed above. The processing then can continue as discussed above depending on whether the node 102 is about to send a beacon or whether the node 102 receives another beacon from another node 102, 106 or 107.

However, if the node 102 determines in step 770 that its relative velocity with respect to node "k" is not greater than the velocity threshold, the processing proceeds to step 780 where the node 102 determines whether the value of the time stamp TS less the last mobility time (i.e., the last time the node 102 determined mobility) is greater than a variable FixTime, which represents the time required to determine whether node is stationary. If not, the processing ends, and can continue as discussed above depending on whether the node 102 is about to send a beacon or whether the node 102 receives another beacon from another node 102, 106 or 107. However, if so, the processing continues to step 785 and the node 102 sets its mobility variable to zero (0), indicating that the node 102 has determined that it no longer mobile. That is, if the node 102 has not been able to determine that is it mobile with respect to all stationary nodes "k" for a certain period of time, the node 102 will determine that it is no longer mobile.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for determining mobility of a node in a wireless communication network, the method comprising within the node:
receiving mobility status information from a plurality of other nodes operating within the wireless communication network, wherein the mobility status information identifies each of the other nodes as either a mobile node or a stationary node;
measuring distance information representing a change in distance between the node and each of the stationary nodes in the wireless communication network; and
identifying the node as mobile when the node determines from the measured distance information that it is mobile before each of the other stationary nodes is identified as mobile.

2. A method as claimed in claim 1, further comprising:
periodically performing each of the receiving, measuring, and identifying steps.

3. A method as claimed in claim 1, further comprising:
operating the node to transmit information indicating whether the node is identified as mobile or stationary.

4. A method as claimed in claim 1, further comprising:
mathematically processing the distance information to generate the change in distance value.

5. A method as claimed in claim 4, wherein:
the change in distance value represents a relative velocity between the node and the other node; and
the identifying step comprises identifying the node as mobile or stationary based on the relative velocity and the information received from the other node.

6. A method as claimed in claim 1, wherein:
the identifying step comprises determining a likelihood that the node is stationary based on an average of relative velocities of the node with respect to the other nodes and a skewness of the average of the relative velocities, and determining whether to identify the node as stationary based on the determined likelihood.

7. A method as claimed in claim 1, wherein:
the identifying step comprises setting a value for a verification time based on a likelihood that the node is stationary, and assessing whether the node is stationary or mobile during the verification time.

8. A method for determining mobility of a node in a wireless communication network, the method comprising:
operating the node to receive respective information from each of a plurality of other nodes in the network, each respective information indicating whether the respective other node is identified as a mobile node or a stationary node;
operating the node to determine its respective relative velocity with respect to each of a plurality of other nodes in the network; and
operating the node to determine whether it should be identified as mobile or stationary based on the respective relative velocities and the respective information.

9. A method as claimed in claim 8, wherein:
the node performs the operating steps to determine its respective velocity and to determine whether it should be identified as mobile or stationary at each time that the node receives the respective information from a respective other node.

10. A method as claimed in claim 8, further comprising:
operating the node to periodically determine whether it should remain identified as mobile or stationary.

11. A method as claimed in claim 8, further comprising:
operating the node to transmit information indicating that it is identified as mobile or stationary.

12. A node, for communication in a wireless network, comprising:
a transceiver; and
a controller, operating to control the transceiver to communicate with at least one other node in the wireless communication network including receiving mobility status information from a plurality of other nodes operating within the wireless communication network, wherein the mobility status information identifies each of the other nodes as either a mobile node or a stationary node, and further operating to measure distance information representing a change in distance between the node and the each of the stationary nodes in the wireless communication network, and to identify the node as mobile when the node determines from the measured distance information that it is mobile before each of the other stationary nodes is identified as mobile.

13. A node as claimed in claim 12, wherein:
the controller further operates to control the transceiver to periodically communicate with the other node; and
the controller further operates to periodically repeat the receiving, measuring, and identifying operations.

14. A node as claimed in claim 12, wherein:
the controller further operates to control the transceiver to transmit information indicating whether the node is identified as mobile or stationary.

15. A node as claimed in claim 12, wherein:
the controller further operates to mathematically process the distance information to generate the change in distance value.

16. A node as claimed in claim 15, wherein:
the change in distance value represents a relative velocity between the node and the other node; and
the controller further operates to identify the node as mobile or stationary based on the relative velocity and the information received from the other node.

17. A node as claimed in claim 12, wherein:
the controller operates to determine a likelihood that the node is stationary based on an average of relative velocities of the node with respect to the other nodes and a skewness of the average of the relative velocities, and determine whether to identify the node as stationary based on the determined likelihood.

18. A node as claimed in claim 12, wherein:
the controller operates to set a value for a verification time based on a likelihood that the node is stationary, and assess whether the node is stationary or mobile during the verification time.

19. The method of claim 1, further comprising:
identifying the node as being mobile relative to at least one or more other stationary nodes;
setting an expiration timer proportional to a probability of the node being mobile relative to at least one or more other stationary nodes; and
determining that the node is mobile if, by the time the timer has expired, the node has not received notice from the at least one stationary node that it is no longer stationary.

20. The method of claim 19, wherein the probability is proportional to a relative velocity of the node relative to all other stationary nodes.

* * * * *

UNITED STATES PATENT AND TRADEMARK OFFICE
CERTIFICATE OF CORRECTION

PATENT NO.        : 7,830,842 B2
APPLICATION NO.   : 11/314219
DATED             : November 9, 2010
INVENTOR(S)       : Strutt et al.

It is certified that error appears in the above-identified patent and that said Letters Patent is hereby corrected as shown below:

IN THE DRAWINGS

In Fig. 7, Sheet 6 of 6, for Tag "760", Line 3, delete "Vlim" and insert -- $V_{lim}$ --, therefor.

In Fig. 7, Sheet 6 of 6, for Tag "765", Line 2, delete "$t_{vertif}$," and insert -- $t_{verif}$ --, therefor.

In Fig. 7, Sheet 6 of 6, for Tag "770", Line 3, delete ">Vilm?" and insert -- >$V_{lim}$? --, therefor.

IN THE SPECIFICATION

In Column 5, Line 27, delete "prior" and insert -- priori --, therefor.

In Column 7, Line 20, delete "FIG. 6:" and insert -- FIG. 6. --, therefor.

In Column 9, Line 9, delete "tverif," and insert -- $t_{verif}$ --, therefor.

In Column 9, Line 54, delete "Vlim:" and insert -- $V_{lim}$: --, therefor.

In Column 10, Line 23, delete "limitTs$_{lim(k)}$" and insert -- limit Ts$_{lim(k)}$ --, therefor.

Signed and Sealed this
Fifth Day of June, 2012

David J. Kappos
*Director of the United States Patent and Trademark Office*